C. H. TESSY.

Improvement in Sash-Holders.

No. 131,980.  Patented Oct. 8, 1872.

WITNESSES.
Harry M. Phillips.
Jms. Wagner.

Inventor.
Chas. H. Tessy
by Johnson Klaucke & Co
his Attorneys.

UNITED STATES PATENT OFFICE.

CHARLES H. TESSY, OF UTICA, NEW YORK, ASSIGNOR OF ONE-HALF OF HIS RIGHT TO SIDNEY I. WAILES, OF BALTIMORE, MARYLAND.

IMPROVEMENT IN SASH-HOLDERS.

Specification forming part of Letters Patent No. 131,980, dated October 8, 1872; antedated October 1, 1872.

CASE B.

*To all whom it may concern:*

Be it known that I, CHARLES H. TESSY, of Utica, in the county of Oneida and State of New York, have invented certain new and useful Improvement in Spring-Bolts, of which the following is a specification:

My improvement relates to spring-bolts for sash-holders and other purposes; and it consists in the arrangement and construction of beveled or socket bearings on the fixed plate and the bolt for the purpose of receiving and confining the enlarged ends of a rubber spring, so as to exert a constant pulling force upon the bolt; and also, in the combination of the several parts of the bolt, arranged and constructed to operate as will be hereafter described.

Figure 1:
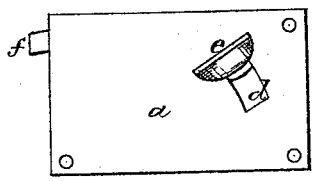
Figure 2:
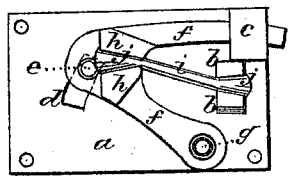
Figure 3:
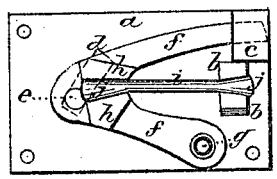

In the accompanying drawing, Figure 1 represents the outer face of the bolt-plate, showing the thumb-piece which operates the bolt; Fig. 2 represents an inner-face view of the bell-crank bolt when projected outwardly; and Fig. 3 represents a similar view, showing the bolt drawn back.

The plate $a$ of my improved locking device is cast with two projections, $b$, forming a beveled bearing, and with a square sleeve, $c$, a pin, $g$, to form a pivot for the bolt, and a curved slot, $d$, through which the thumb-piece $e$ of the bolt $f$ passes. This bolt $f$ is formed in bell-crank shape, having two pieces, $h$, cast on its bend to form a beveled bearing similar to the bearing $b$, and an opening, $k$, in its lower end to fit over the pin $g$. A straight rubber spring, $i$, having enlarged ends $j$, is held with one end in the bearing $b$ on the plate $a$, and with the other end in the bearing $h$ on the bend of the bolt, the beveled bearings holding the enlarged ends $j$ of the spring $i$ and preventing them from slipping out.

In putting the parts together the thumb-piece $e$ is passed through the slot $d$, the bill-hook-shaped free end of the bolt passed through sleeve $c$, and the opening $k$ in the lower end of the bolt passed over the pin $g$. The spring $i$ is then secured in the bearings $b\ h$, having a tendency to keep the free end of the bolt extended outwardly through the sleeve $c$ by occupying a central position between the limbs of the bolt and the bearing $b$, from which it pulls.

The thumb-piece $e$ may be cast with or be secured to the bolt in any suitable way.

From the foregoing description it is obvious that my improved bolt may be constructed very cheaply, may be easily put together, and conveniently applied for use.

Having described my invention, I claim—

1. The beveled bearings or sockets $b$ and $h$, arranged to receive and confine the correspondingly-enlarged ends of a rubber spring, whereby said spring exerts a constant pulling force upon the locking end of said bolt, as described.

2. The plate $a$, having the sleeve $c$, curved slot $d$, bearings $b$, and pin $g$ cast in one piece, in combination with the bell-crank-shaped bolt $f$, having bearings $h$ and pivot-opening $k$, and provided with thumb-piece $e$ and the rubber spring $i$, all as described, and for the purpose set forth.

The above specification of my improvement in locks signed this 19th day of February, 1872.

Witnesses:     CHARLES H. TESSY.
  A. E. H. JOHNSON,
  ALEXR. A. C. KLAUCKE.